(12) United States Patent
Chae et al.

(10) Patent No.: US 10,187,123 B2
(45) Date of Patent: Jan. 22, 2019

(54) DISTRIBUTED RADIO BASE STATION (71) Applicant: CMAXWIRELESS.CO., LTD., Daegu (KR)

(72) Inventors: Young-su Chae, Daegu (KR); Min-ho Sung, Yongin-si (KR); Dong-hoon Chae, Suwon-si (KR)

(73) Assignee: CMAXWIRELESS.CO., LTD., Daegu (KR)

(*) Notice: Subject to any disclaimer, the term of this patent is extended or adjusted under 35 U.S.C. 154(b) by 17 days.

(21) Appl. No.: 15/500,094

(22) PCT Filed: Jul. 30, 2014

(86) PCT No.: PCT/KR2014/006973
§ 371 (c)(1),
(2) Date: Jan. 29, 2017

(87) PCT Pub. No.: WO2016/017834
PCT Pub. Date: Feb. 4, 2016

(65) Prior Publication Data
US 2017/0257150 A1 Sep. 7, 2017

(30) Foreign Application Priority Data
Jul. 29, 2014 (KR) .................. 10-2014-0096526

(51) Int. Cl.
*H04B 7/22* (2006.01)
*H04B 7/022* (2017.01)
(Continued)

(52) U.S. Cl.
CPC .............. *H04B 7/022* (2013.01); *H04B 7/24* (2013.01); *H04B 7/26* (2013.01); *H04L 29/06* (2013.01)

(58) Field of Classification Search
CPC .............. H04W 88/085; H04W 88/10; H04W 52/0206; H04W 84/045; H04B 7/024; H04B 7/022; H04B 10/25753; H04B 7/26; Y02D 70/1262; Y02D 70/142; Y02D 70/12; Y02D 70/1242; Y02D 70/1264; Y02D 70/30; H04N 21/6405; H04N 21/6408;
(Continued)

(56) References Cited

U.S. PATENT DOCUMENTS 8,862,170 B2 * 10/2014 Lee .................. H04W 88/085
455/507
2012/0069880 A1  3/2012 Lemson et al.
(Continued)

FOREIGN PATENT DOCUMENTS

KR  10-2012-0070945 A   7/2012
KR  10-2013-0051873 A   5/2013
(Continued)

*Primary Examiner* — Rahel Guarino
(74) *Attorney, Agent, or Firm* — Rabin & Berdo, P.C.

(57) ABSTRACT

The present invention relates to a distributed radio base station, and provides a distributed radio base station, including: one or more base units (BUs) configured to process digital signals; and one or more radio units (RUs) installed in one or more target service areas, and configured to wirelessly communicate with pieces of user equipment; wherein each of the BUs is coupled to a cell group, composed of a set of RU groups each formed by grouping one or more of the RUs, over a transport network.

16 Claims, 5 Drawing Sheets

(51) Int. Cl.
*H04B 7/24* (2006.01)
*H04L 29/06* (2006.01)
*H04B 7/26* (2006.01)

(58) Field of Classification Search
CPC ... H04L 61/6022; H04L 69/326; H04L 67/10; H04L 69/329; H04L 69/163; H04L 69/168; H04L 69/32; H04L 61/6018; H04L 61/6059; H04L 61/6086
See application file for complete search history.

(56) References Cited

U.S. PATENT DOCUMENTS

2012/0281556 A1* 11/2012 Sayana .................. H04B 7/024
370/252
2013/0095873 A1 4/2013 Soriaga et al.
2014/0369305 A1 12/2014 Lee et al.

FOREIGN PATENT DOCUMENTS

| KR | 10-2014-0010522 A | 1/2014 |
|----|-------------------|--------|
| KR | 10-2014-0039991 A | 4/2014 |

\* cited by examiner

DISTRIBUTED RADIO BASE STATION

TECHNICAL FIELD

The present invention relates to a distributed radio base station, and more particularly to a distributed radio base station that is constructed in such a manner as to distribute one or more base units (BUs) and radio units (RUs), wherein the RUs are organized into a plurality of groups, and one or more cell groups are each composed of a set of groups, thereby enabling data to be more efficiently transmitted and received.

BACKGROUND ART

With the development of radio communication and network technologies, technologies for constructing a radio base station in a distributed form have been recently proposed.

The technologies for constructing a radio base station in a distributed form are based on a scheme in which a digital unit (DU) configured to process digital signals and a radio unit (RU) disposed at a remote location are separated from each other, the DU is installed in a data center and the RU is installed in a remote target service area, the DU and the RU are connected to each other, and then data is transmitted and received.

Korean Patent Application Publication No. 10-2013-0051873 relates to "a Radio Base Station and a Data Processing Method therefor," and discloses the radio base station including: a group DU configured to include a plurality of digital units (DUs); and a plurality of Remote Radio Frequency Units (RRUs) connected to the group DU over a transport network and installed in respective target service areas; wherein each of the DUs includes a MAC function unit configured to perform a transmission/reception Medium Access Control (MAC) function, and each of the RRUs includes an encoder configured to encode downlink data received from each of the DUs. According to this technology, a plurality of DUs is grouped, a radio unit (RU) is connected by an optical cable over a transport network, and then data is processed, thereby providing the effect of reducing the amount of data that is transmitted and received.

However, the transport network is constructed using an optical cable and a coaxial cable via separate switching units, and thus this technology has limitations in that a system cannot be constructed using existing commercial IP network equipment or Ethernet network equipment at low cost and in that flexible multi-layer RU grouping and efficient interworking among a plurality of DUs and multi-layer RU groups cannot be performed using the multicasting/broadcasting function of an IP network or an Ethernet network.

PRIOR ART DOCUMENT

Korean Patent Application Publication No. 10-2013-0051873 (published on May 21, 2013)

DISCLOSURE

Technical Problem

The present invention has been conceived to overcome the limitations of the prior art, and an object of the present invention is to provide a distributed radio base station in which RU groups are formed by grouping RUs, one or more cell groups are each composed of a set of RU groups, and one or more corresponding BUs are disposed for the one or more cell groups, thereby enabling the RUs and the BUs to be efficiently distributed and managed based on physical spaces or pieces of user equipment within target service areas.

Another object of the present invention is to provide a distributed radio base station in which one or more RU groups and one or more cell groups are constructed such that they can be dynamically changed, thereby minimizing the waste of resources attributable to changes in the circumstances of target service areas.

A further object of the present invention is to provide a distributed radio base station that enables data to be transmitted and received between one or more BUs and one or more RUs by using interface specifications between L2 and L1, thereby efficiently reducing the use of a transmission band in a transport network.

Technical Solution

In order to accomplish the above objects, the present invention provides a distributed radio base station, including: one or more base units (BUs) configured to process digital signals; and one or more radio units (RUs) installed in one or more target service areas, and configured to wirelessly communicate with pieces of user equipment; wherein each of the BUs is coupled to a cell group, composed of a set of RU groups each formed by grouping one or more of the RUs, over a transport network.

In this case, each of the RU groups may be composed of RUs grouped based on the physical space of a corresponding one of the target service areas.

Each of the RU groups may be composed of RUs grouped based on information about the pieces of user equipment.

One of the RUs may be included in a plurality of RU groups.

One of the RU groups may be included in a plurality of cell groups.

The BUs may perform the operations of layers equal to or higher than L2 and L3, and the RUs may perform the operation of L1; and each of the RUs may include: an L1 processing unit configured to perform the operation of L1; an RF processing unit configured to process radio signals; and an antenna configured to transmit or receive radio signals.

In this case, when the transport network is an IP network, it is preferred that each of the BUs and corresponding ones of the RUs have respective single unique unicast IP addresses on the transport network and use one or more multicast IP addresses.

Each of the RUs may use a number of multicast IP addresses equal to the number of RU groups to which the RU belongs, and may also uses a cell group multicast IP address unique to a cell group to which the RU belongs; and each of the BUs may use a number of multicast IP addresses equal to the number of RU groups to which the BU is coupled, and may also uses a cell group multicast IP address unique to a cell group to which the BU is coupled.

The BU may transmit the same data to RUs, belonging to the RU groups to which the BU is coupled, by transmitting a plurality of IP unicast packets having the respective unique unicast IP addresses of the RUs, belonging to the RU groups to which the BU is coupled, as destination addresses.

The BU may transmit the same data to RUs, belonging to the RU groups to which the BU is coupled, by transmitting single IP multicast packets having the respective multicast IP addresses of the RU groups, to which the BU is coupled, as destination addresses.

The BU may transmits the same data to all RUs of the cell group, to which the BU is coupled, by transmitting an IP multicast packet having a multicast IP address of the corresponding cell group as a destination address.

When the transport network is an Ethernet, each of the BUs and corresponding ones of the RUs have respective single unique MAC addresses on the transport network, and use one or more multicast MAC addresses.

Each of the RUs may use a number of multicast MAC addresses equal to the number of RU groups to which the RU belongs, and also may use a cell group multicast MAC address unique to a cell group to which the RU belongs; and each of the BUs may use a number of multicast MAC addresses equal to the number of RU groups to which the BU is coupled, and also may use a cell group multicast MAC address unique to a cell group to which the BU is coupled.

The BU may transmit the same data to RUs, belonging to the RU groups to which the BU is coupled, by using a plurality of Ethernet unicast frames having the respective unique unicast MAC addresses of the RUs, belonging to the RU groups to which the BU is coupled, as destination addresses.

The BU may transmit the same data to RUs, belonging to the RU groups to which the BU is coupled, by using Ethernet multicast frames having the respective multicast MAC addresses of the RU groups, to which the BU is coupled, as destination addresses.

The BU may transmit the same data to all RUs, belonging to the cell group to which the BU is coupled, by using an Ethernet multicast frame having the multicast MAC address of the corresponding cell group as a destination address.

The RU groups and the cell groups may be changeable such that they can be dynamically constructed.

Advantageous Effects

According to the present invention, there may be provided a distributed radio base station in which RU groups are formed by grouping RUs, one or more cell groups are each composed of a set of RU groups, and one or more corresponding BUs are disposed for the one or more cell groups, thereby enabling the RUs and the BUs to be efficiently distributed and managed based on physical spaces or pieces of user equipment within target service areas.

Furthermore, according to the present invention, there may be provided a distributed radio base station in which one or more RU groups and one or more cell groups are constructed such that they can be dynamically changed, thereby minimizing the waste of resources attributable to changes in the circumstances of target service areas.

Moreover, according to the present invention, there may be provided a distributed radio base station that enables data to be transmitted and received between one or more BUs and one or more RUs by using interface specifications between L2 and L1, thereby efficiently reducing the use of a transmission band in a transport network.

BEST MODE

Embodiments of the present invention will be described in detail below with reference to the accompanying drawings.

Figure 1:
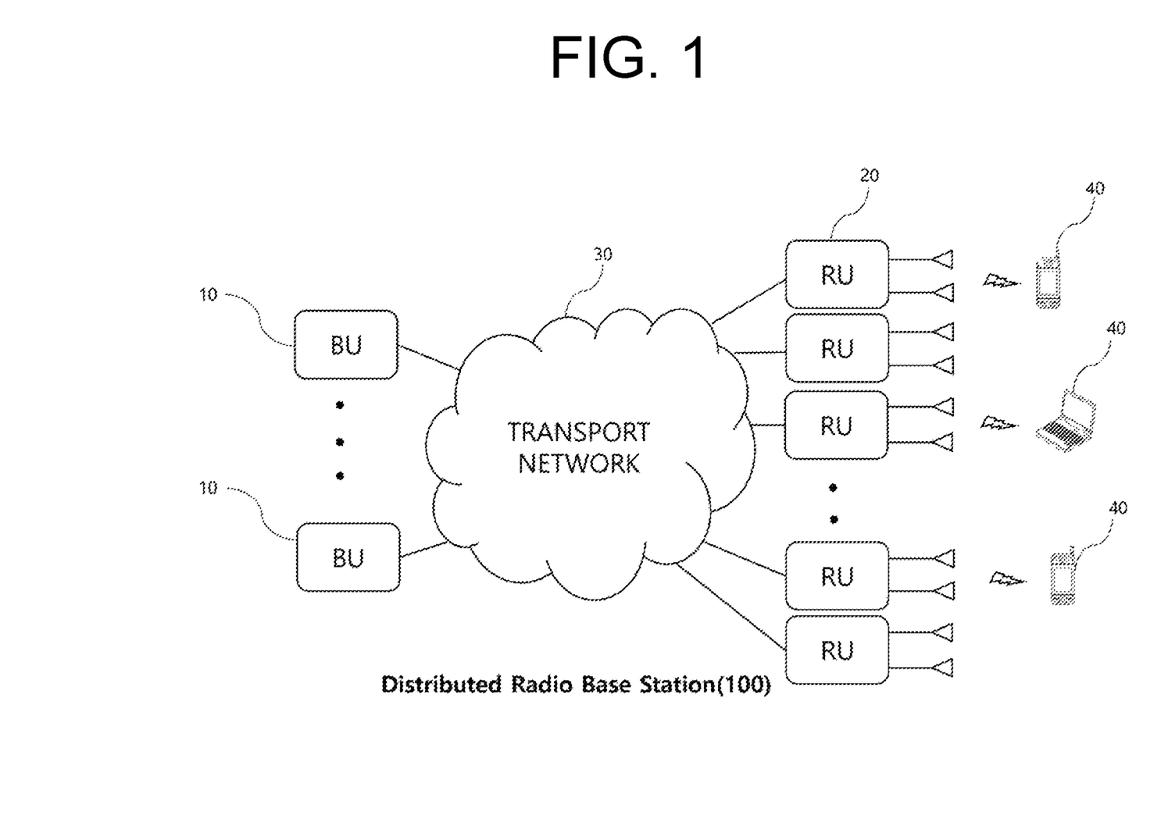
FIG. 1 is a diagram illustrating the configuration of a distributed radio base station (100) according to the present invention.

FIG. 1 is a diagram illustrating the configuration of the distributed radio base station 100 according to the present invention.

Referring to FIG. 1, the distributed radio base station 100 includes one or more BUs 10 and one or more RUs 20, and the BUs 10 and the RUs 20 are coupled with each other over a transport network 30.

The BUs 10 are connected to a core network (not shown), and function to process digital signals. The BUs 10 are generally installed in a central data center or the like, and transmit and receive data to and from the remote RUs 20 over the transport network 30. The BUs 10 are also commonly referred to as digital units (DUs).

In this case, the BUs 10 are logical units. Each of the BUs 10 may be formed as an independent physical unit, and a plurality of BUs 10 may be formed as a single physical unit. Furthermore, the BUs 10 perform the operations of layers equal to or higher than Layer 2 (L2) and Layer 3 (L3) of the OSI 7-layer model according to corresponding protocols.

The RUs 20 are installed in target service areas, wirelessly communicate with pieces of user equipment 40 in the target service areas, and transmit and receive data to and from the BUs 10 over the transport network 30. In this case, the RUs perform the operation of Layer 1 (L1) of the OSI 7-layer model.

Figure 2:
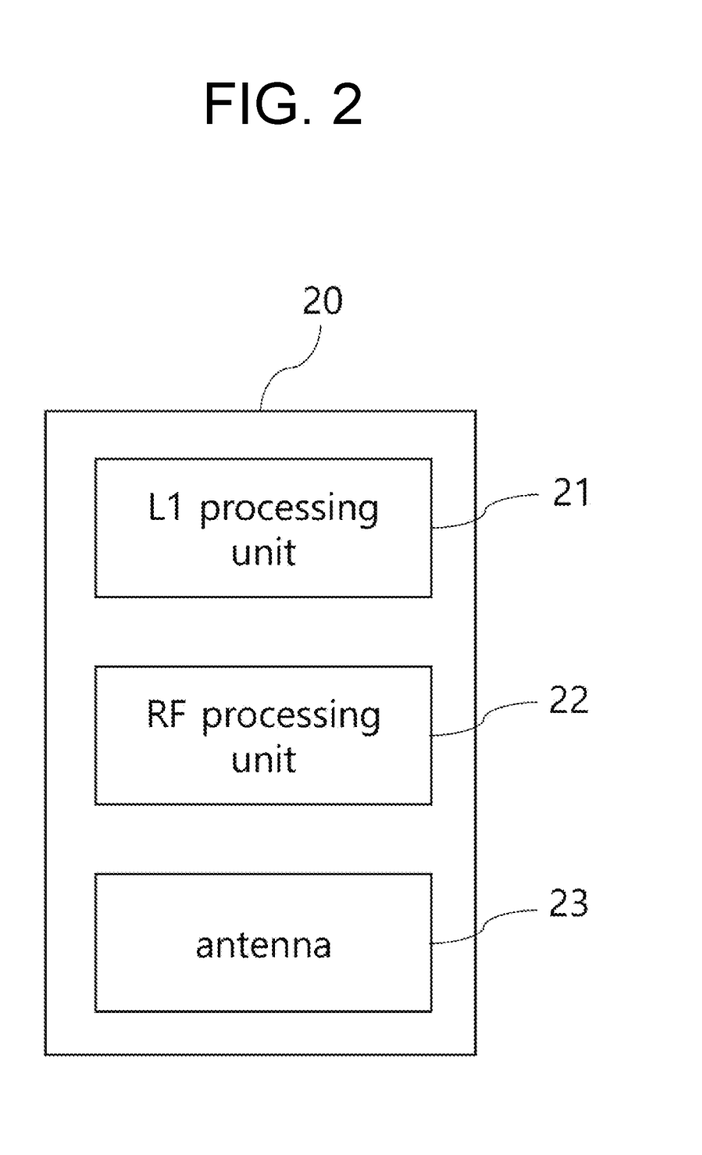
FIG. 2 is a diagram showing the internal configuration of a radio unit (20)

FIG. 2 is a diagram showing the internal configuration of each of the RUs 20.

As shown in FIG. 2, the RU 20 includes at least one L1 processing unit 21 and at least one RF processing unit 22. The RU may further include at least one antenna 23.

The L1 processing unit 21 performs the operation of L1 (Layer 1) of the OSI 7-layer model, and may simultaneously perform the operation of L1 for a plurality of pieces of data.

The RF processing unit 22 performs an RF processing function, i.e., a radio signal conversion function for radio communication with corresponding user equipment 40. The RF processing unit 22 may also simultaneously perform RF processing for a plurality of frequency bands.

The antenna 23 functions to transmit a radio signal, processed by the RF processing unit 22, to the user equipment 40, or functions to receive a radio signal from the user equipment 40 and transfer the radio signal to the RF processing unit 23. The antenna 23 may include two or more antennas in order to support MIMO (SU-MIMO/MU-MIMO) or diversity.

In the present invention, the RU 20 may have at least two operation modes. One of the modes is a normal base station transmission mode, and the other one is a sniffering mode. The RU 20 may perform a base station signal reception operation in the sniffering mode like the user equipment 40, and may support the initial configuration of an SON process, the optimization of operation, etc. via the sniffering mode.

The transport network 30 may be a 3-layer network such as an IP network, or may be a 2-layer network such as an Ethernet or the like. Alternatively, the transport network 30 may be constructed using another wired/wireless communication method.

The BU 10 and the RU 20 configured as described above use respective ID identifiers and one or more addresses on the transport network in order to communicate with each other over the transport network 30.

First, when the transport network 30 is an L3 IP network, the BU 10 and the RU 20 have unique unicast IP addresses on the transport network, and use one or more multicast IP addresses.

When the transport network 30 is an L2 Ethernet, the BU 10 and the RU 20 have unique Media Access Control (MAC) addresses on the transport network, and use one or more multicast MAC addresses.

The exchange of data between the BU 10 and the RU 20 conforms with interface specifications between L2 and L1. Data exchanged in conformity with the interface specifications is composed of burst data, for example, a TB in the case of LTE, and control data.

In the radio base station 100, a flow through which a radio signal is transmitted to the user equipment 40 via a downlink is as follows. The BU 10 performs L3 and L2 operations on downlink data received from a core network, and transfers the resulting downlink data to one or more RUs 20 over the transport network 30, and each of the RUs 20 performs an L1 operation on the data received from the BU 10, converts the received data into a radio signal via the RF processing unit 22, and transmits the radio signal to one or more of the pieces of user equipment 40 through the antenna 23.

Meanwhile, the processing of uplink data transferred from one of the pieces of user equipment 40 to the core network is as follows. One or more RUs 20 perform an L1 operation on signals, received from the user equipment 40 through antennas 23, via RF processing units 22, and transmit resulting signals to one or more BUs 10 over the transport network 30. The BUs 10 combine or select one or more pieces of uplink data transferred from the RUs 20, perform L2 and L3 operations on resulting data, and transfer processed resulting data to the core network.

Meanwhile, the BUs 10 and the RUs 20 may use a security enhancement technique suitable for the transport network, such as IPSec or the like, in order to perform enhanced security data transmission and reception over the transport network 30.

Although data between an RU and a BU 10 is an encoded radio signal in a common radio base station, data between the BUs 10 and the RUs 20 conforms with the interface specifications between L2 and L1 according to the present invention, and thus a transmission band required for the transmission of the data between the BUs 10 and the RUs 20 can be reduced.

Figure 3:
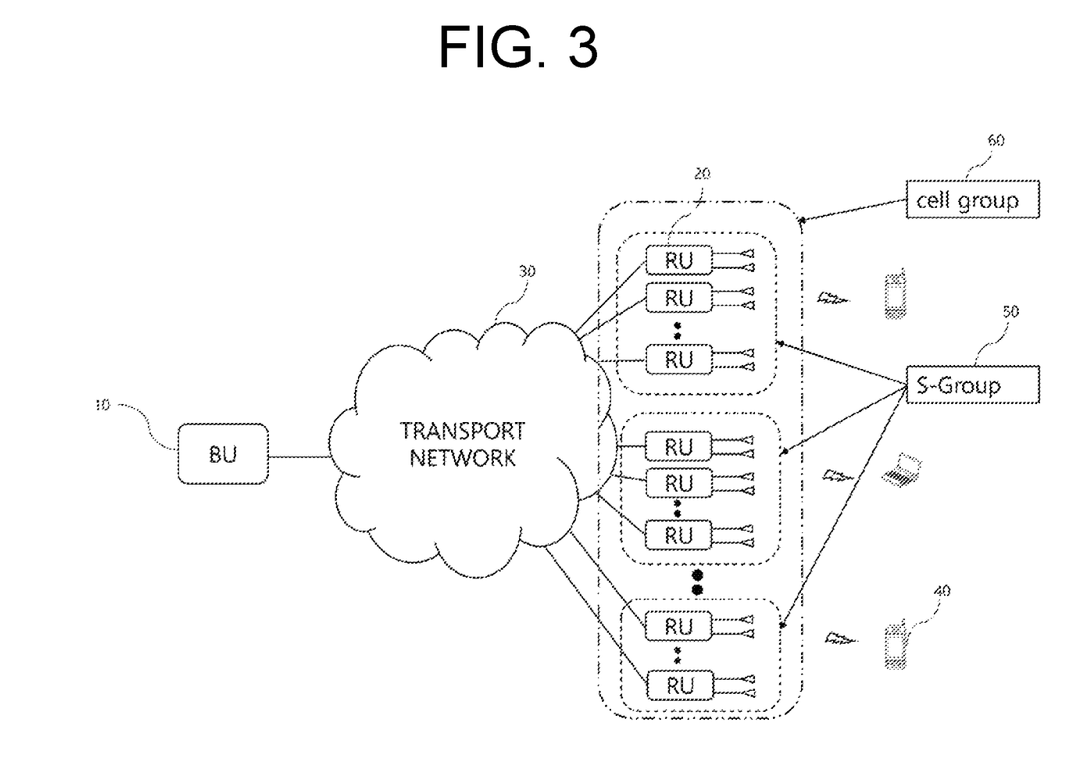
FIG. 3 is a diagram illustrating the configuration of a distributed radio base station (100) according to an embodiment of the present invention.

FIG. 3 is a diagram illustrating the configuration of a distributed radio base station 100 according to an embodiment of the present invention.

Referring to FIG. 3, it can be seen that one or more RUs 20 are grouped and form an RU group 50 (hereinafter referred to as the "S-group"). Furthermore, in FIG. 3, three S-groups 50 form a single cell group 60.

The cell group 60 performs the function of a cell in a common radio communication system, which can be logically identified by pieces of user equipment 40. The cell group 60 is coupled to a single BU 10 over a transport network 30, and may be dynamically constructed by the BU 10. The S-groups 50 refer to groups of RUs each including one or more selected RUs 20 within the single cell group, and enable the RUs 20, required for communication with specific user equipment 40, to be selectively/limitedly operated. The S-groups 50 may be dynamically constructed, which facilitates interference control between cells, the reuse of physical radio resources through spatial segmentation within a cell, and dynamic cell construction.

The S-groups 50 may be constructed using various methods.

A first method is a method of segmenting a physical space into one or more S-groups 50 based on the physical space of a target area that will be served by the cell group 60. In this case, segment physical spaces may overlap each other. Each of the segment physical spaces is a set of RUs 20 supporting each physical space, and may form an S-group.

For example, in connection with the segmentation of a physical space, when a service is constructed within a high-rise building, each floor may be configured as a single S-group 50 and the overall building may be served using a plurality of S-groups 50.

A second method is a method of forming an S-group 50 for each piece of user equipment 40, which may be performed by a method described below.

Each RU 20 receives the uplink data (an uplink random access signal, a channel state information transmission signal, a paging response signal, an uplink terminal reference signal, or the like) of user equipment 40, and transmits the received uplink data to the BU 10. The BU 10 may collect the uplink data and information of the user equipment 40 received from one or more RUs 20, and may form an S-group 50 supporting the specific user equipment 40 by considering channel states between the RUs 20 and the user equipment 40.

Meanwhile, the S-group 50 may dynamically change according to a spatial segmentation policy or the movement of the user equipment 40. The distributed radio base station 100 according to the present invention may be constructed, maintained and managed as one or more S-groups 50 based on spatial segmentation and one or more S-groups 50 based on respective pieces of user equipment 40 in combination. Furthermore, a radio multicast/broadcast service (for example, the eMBMS service of LTE, or the like) may use S-groups 50 based on spatial segmentation or a cell group 60, and a unicast service for specific user equipment 40 may use an S-group 50 for each piece of user equipment 40 or spatial segmentation-based S-groups 50/a cell group 60.

When the S-group 50 for each piece of user equipment 40 is used for a unicast service, an effect is achieved in that interference between S-groups 50 or cell groups 60 can be controlled by transmitting a radio signal to the user equipment 40 only via required RUs 20.

Meanwhile, a single RU 20 may belong to one or more S-groups 50, and may belong to one or more cell groups 60. Furthermore, each S-group 50 may also belong to one or more cell groups 60.

Meanwhile, the S-group 50 may be changed to be dynamically formed. The dynamic formation of the S-group 50 is similar to the selection of an antenna group in a distributed antenna system. However, the dynamic formation of the S-group 50 is different from the selection of an antenna group in a distributed antenna system in that the dynamic formation can perform efficient processing by distributing RF data processing requiring a high computational load among individual RUs 20 through the grouping of distributed RUs 20 including an L1 operation in place of antennas and in that the dynamic formation enables a required transport network bandwidth between the RUs 20 and a BU 10 to be reduced and also enables a transport network delay time requirement therebetween to be loosely managed.

Furthermore, each RU 20 within the S-group 50 includes a minimum of two antennas, and is distinctive in that the RU 20 independently performs the SU-MIMO/MU-MIMO operation of a common each cell through the performance of an L1 operation. Each RU 20 may belong to one or more S-groups 50, and may belong to one or more cell groups 60.

Each BU 10 may be connected to RUs 20 belonging to a single cell group 60 via the transport network 30, and may perform the function of a radio base station. Each BU 10 may transfer data to one specific RU 10 of the corresponding cell group 60. Furthermore, each BU 10 may transfer the same data to all RUs 20 belonging to a specific S-group 50, and may transfer the same data to all the RUs 20 belonging to the specific cell group 60.

Figure 4:
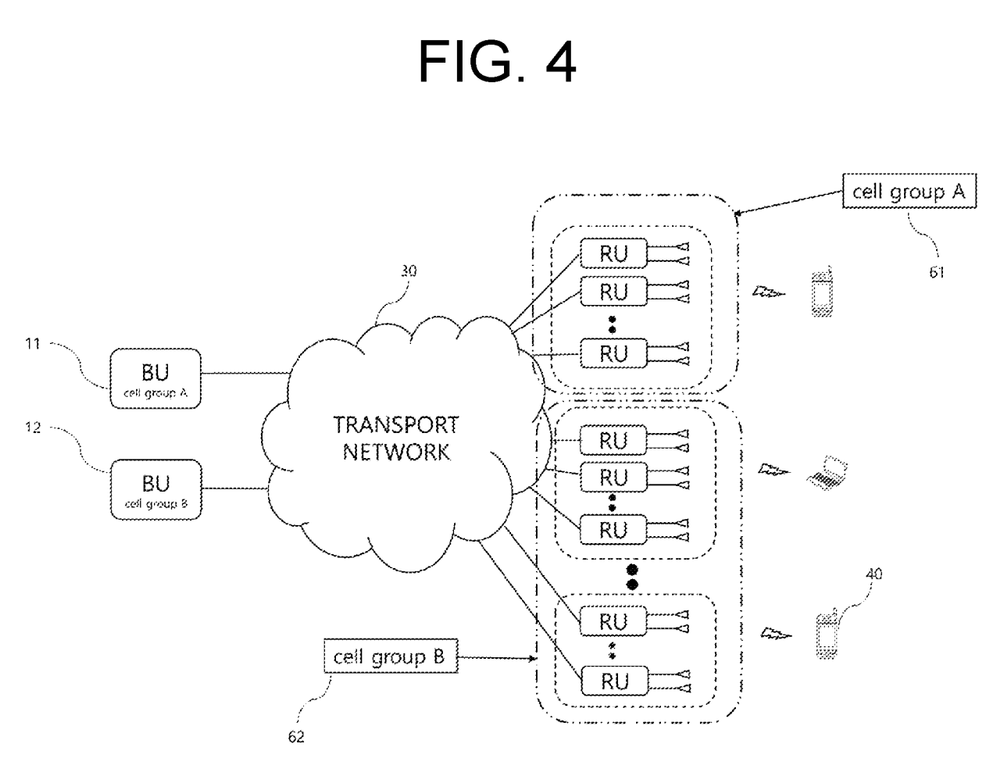
FIG. 4 is a diagram illustrating a method of dynamically constructing S-groups (50) and cell groups (60)

FIG. 4 is a diagram illustrating a method of dynamically constructing S-groups 50 and cell groups 60.

In FIG. 3, an example of the cell group 60 connected to the single BU 10 and an example of the plurality of S-groups 50 constituting the cell group 60 are shown. In this state, each of the RUs 20 is connected only to one of the S-groups 50 and the one cell group 60.

For example, when the distributed radio base station 100 according to the present invention is installed in a high-rise building, a single S-group 50 may be composed of a group of RUs 20 that serve one floor within a building. In order to serve a plurality of floors, a plurality of S-groups 50, one for each floor, may be constructed, and the overall building may be served using the same cell group 60 using a single BU 10. Furthermore, the S-groups 50 and the cell group 60 may be dynamically reconstructed. FIG. 4 shows an example of splitting a cell or an example of merging cells through the dynamic construction of cell groups 60.

Initially, a single cell group 60 is formed using a single BU 10, and the target service areas of all S-groups 50 are supported via the single cell group 60, as shown in FIG. 3. Thereafter, when the service capacity of the target area needs to increase due to an increase in users, a plurality of cell groups (a cell group A 61, and a cell group B 62) may be constructed by splitting the existing cell group, a BU may be added, and a plurality of cells may be operated via a plurality of BUs 11 and 12 corresponding to the respective cell groups, as shown in FIG. 4.

Furthermore, in the case of a decrease in required service capacity or the like, a plurality of separate cell groups, such as those of FIG. 4, may be merged into a single cell group 60, such as that of FIG. 3.

Figure 5:
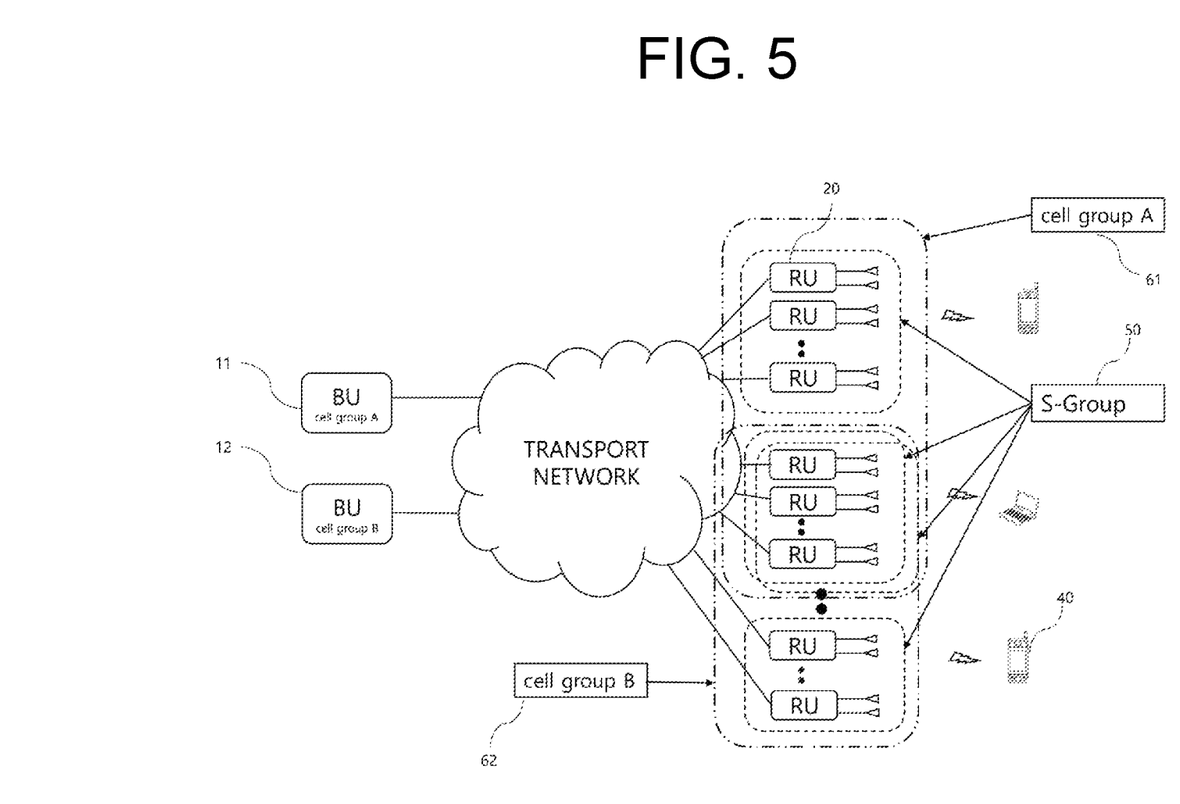
FIG. 5 is a diagram showing the configuration of a distributed radio base station (100) according to another embodiment of the present invention.

FIG. 5 is a diagram showing the configuration of a distributed radio base station 100 according to another embodiment of the present invention.

Although the distributed radio base station 100 of FIG. 5 is basically the same as that of FIG. 4, they are different in that each RU 20 may belong to a plurality of S-groups 50 and a plurality of cell groups 61 and 62, the S-groups 50 may overlap each other, and the cell groups 60 may overlap each other.

That is, one of the S-groups 50 may belong to the plurality of cell groups 61 and 62, and thus each RU 20 included in the corresponding S-group 50 may belong to the plurality of cell groups 61 and 62.

Next, a method of processing data in the distributed radio base station 100 according to the present invention, such as that described above, will be described.

First, when the transport network 30 is an L3 IP network, each RU 20 has a unicast IP address unique to the transport network 30, and uses a number of S-group IP multicast addresses equal to the number of participating S-groups 50 and a cell group IP multicast address unique to a cell group 60.

Each BU 10 has a unicast IP address unique to the transport network 30, and uses a number of S-group IP multicast addresses equal to the number of supporting S-groups 50 and a cell group IP multicast address unique to the cell group 60.

There are at least two methods by which a BU 10 transmits the same data to all RUs 20 that belong to a specific S-group 50.

A first method is a method in which the BU 10 transmits the same data to individuals RU 20 by using a plurality of IP unicast packets having the unique unicast IP addresses of the respective RU 20 as destination addresses.

A second method is a method in which the BU 10 transmits the same data by using a single IP multicast packet having a corresponding S-group IP multicast address as a destination address.

To transmit the same data to all RUs 20 belonging to a specific cell group 60, the BU 10 transmits the data by using an IP multicast packet having a corresponding cell group IP multicast address as a destination address.

Meanwhile, when the transport network 30 is an L2 Ethernet, each RU 20 has a unique unicast MAC address, and uses a number of S-group multicast MAC addresses equal to the number of participating S-groups 50 and a cell group multicast MAC address unique to a cell group 60.

Each BU 10 has a unique unicast MAC address, and uses a number of S-group multicast MAC addresses equal to the number of supporting S-groups 50 and a cell group multicast MAC address unique to the cell group 60.

There are at least two methods by which a BU 10 transmits the same data to all RUs 20 belonging to a specific S-group 50.

A first method is a method in which the BU 10 transmits the same data to the individual RUs 20 by using a plurality of Ethernet unicast frames having the unique unicast MAC addresses of the respective RUs 10 as destination addresses.

A second method is a method in which the BU 10 transmits data by using an Ethernet multicast frame having a corresponding S-group multicast MAC address as a destination address.

To transmit the same data to all RUs 10 belonging to a specific cell group 60, the BU 10 transmits data by using an Ethernet multicast frame having a corresponding cell group multicast MAC address as a destination address.

Meanwhile, when another wired/radio communication method is used for the transport network, S-group multicasting and cell group multicasting may be supported using a method unique to the corresponding technology.

According to the above method, when the number of RUs 20 belonging to an S-group/a cell group is N, a multicast method may use a maximum of N times less transmission bandwidth of the transport network 30 than a unicast method.

Although the embodiments according to the present invention have been described above, it will be apparent that the present invention is not limited to the embodiments and various modifications/variations may be made within the scope of the present invention that is determined with reference to the attached claims and the accompanying drawings.

The invention claimed is:

1. A distributed radio base station, comprising:
one or more base units (BUs) configured to process digital signals; and
one or more radio units (RUs) installed in one or more target service areas, and configured to wirelessly communicate with pieces of user equipment;
wherein each of the BUs is coupled to a cell group, composed of a set of RU groups each formed by grouping one or more of the RUs, over a transport network,
wherein, when the transport network is an IP network, each of the BUs and corresponding ones of the RUs have respective single unique unicast IP addresses on the transport network, and use one or more multicast IP addresses.

2. The distributed radio base station of claim 1, wherein each of the RU groups is composed of RUs grouped based on a physical space of a corresponding one of the target service areas.

3. The distributed radio base station of claim 1, wherein each of the RU groups is composed of RUs grouped based on information about the pieces of user equipment.

4. The distributed radio base station of claim 1, wherein one of the RUs is included in a plurality of RU groups.

5. The distributed radio base station of claim 1, wherein one of the RU groups is included in a plurality of cell groups.

6. The distributed radio base station of claim 1, wherein:
the BUs perform operations of layers equal to or higher than L2 and L3, and the RUs perform an operation of L1; and
each of the RUs comprises: an L1 processing unit configured to perform an operation of L1; an RF processing unit configured to process radio signals; and an antenna configured to transmit or receive radio signals.

7. The distributed radio base station of claim 1, wherein:
each of the RUs uses a number of multicast IP addresses equal to a first number of RU groups to which the RU belongs, and also uses a cell group multicast IP address unique to a cell group to which the RU belongs; and
each of the BUs uses a number of multicast IP addresses equal to a second number of RU groups to which the BU is coupled, and also uses a cell group multicast IP address unique to a cell group to which the BU is coupled.

8. The distributed radio base station of claim 7, wherein the BU transmits identical data to RUs, belonging to the RU groups to which the BU is coupled, by transmitting a plurality of IP unicast packets having respective unique unicast IP addresses of the RUs, belonging to the RU groups to which the BU is coupled, as destination addresses.

9. The distributed radio base station of claim 7, wherein the BU transmits identical data to RUs, belonging to the RU groups to which the BU is coupled, by transmitting single IP multicast packets having respective multicast IP addresses of the RU groups, to which the BU is coupled, as destination addresses.

10. The distributed radio base station of claim 7, wherein the BU transmits identical data to all RUs of the cell group, to which the BU is coupled, by transmitting an IP multicast packet having a multicast IP address of the corresponding cell group as a destination address.

11. The distributed radio base station of claim 1, wherein the RU groups and the cell groups are changeable such that they can be dynamically constructed.

12. A distributed radio base station, comprising:
one or more base units (BUs) configured to process digital signals; and
one or more radio units (RUs) installed in one or more target service areas, and configured to wirelessly communicate with pieces of user equipment,
wherein each of the BUs is coupled to a cell group, composed of a set of RU groups each formed by grouping one or more of the RUs, over a transport network, and
wherein, when the transport network is an Ethernet, each of the BUs and corresponding ones of the RUs have respective single unique MAC addresses on the transport network, and use one or more multicast MAC addresses.

13. The distributed radio base station of claim 12, wherein:
each of the RUs uses a number of multicast MAC addresses equal to a number of RU groups to which the RU belongs, and also uses a cell group multicast MAC address unique to a cell group to which the RU belongs; and
each of the BUs uses a number of multicast MAC addresses equal to a number of RU groups to which the BU is coupled, and also uses a cell group multicast MAC address unique to a cell group to which the BU is coupled.

14. The distributed radio base station of claim 13, wherein the BU transmits identical data to RUs, belonging to the RU groups to which the BU is coupled, by using a plurality of Ethernet unicast frames having respective unique unicast MAC addresses of the RUs, belonging to the RU groups to which the BU is coupled, as destination addresses.

15. The distributed radio base station of claim 13, wherein the BU transmits identical data to RUs, belonging to the RU groups to which the BU is coupled, by using Ethernet multicast frames having respective multicast MAC addresses of the RU groups, to which the BU is coupled, as destination addresses.

16. The distributed radio base station of claim 13, wherein the BU transmits identical data to all RUs, belonging to the cell group to which the BU is coupled, by using an Ethernet multicast frame having a multicast MAC address of the corresponding cell group as a destination address.

* * * * *